United States Patent
Lamba et al.

(10) Patent No.: US 11,972,477 B2
(45) Date of Patent: Apr. 30, 2024

(54) SYSTEMS AND METHODS FOR CUSTOMER JOURNEY OPTIMIZATION

(71) Applicant: ADOBE INC., San Jose, CA (US)

(72) Inventors: Mukul Lamba, Himachal Pradesh (IN); Saurabh Garg, New Delhi (IN); Aditi Jain, Jaipur (IN)

(73) Assignee: ADOBE INC., San Jose, CA (US)

( * ) Notice: Subject to any disclaimer, the term of this patent is extended or adjusted under 35 U.S.C. 154(b) by 231 days.

(21) Appl. No.: 17/659,194

(22) Filed: Apr. 14, 2022

(65) Prior Publication Data

US 2023/0334558 A1  Oct. 19, 2023

(51) Int. Cl.
*G06Q 30/00* (2023.01)
*G06Q 30/0601* (2023.01)

(52) U.S. Cl.
CPC ..... *G06Q 30/0643* (2013.01); *G06Q 30/0623* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 9,674,362 B2 * | 6/2017 | Piaggio | | H04M 3/5191 |
| 9,986,094 B2 * | 5/2018 | Piaggio | | H04M 3/5141 |
| 10,142,475 B2 * | 11/2018 | Piaggio | | H04M 3/5191 |
| 10,198,490 B2 | 2/2019 | No et al. | | |
| 10,270,912 B2 * | 4/2019 | Piaggio | | G06Q 30/0201 |
| 10,404,860 B2 * | 9/2019 | Piaggio | | H04M 3/5141 |
| 10,567,585 B2 * | 2/2020 | Piaggio | | H04M 3/5141 |
| 10,715,667 B2 * | 7/2020 | Piaggio | | G06Q 30/0201 |
| 10,909,128 B2 * | 2/2021 | Beringer | | G06F 16/248 |
| 11,019,210 B2 * | 5/2021 | Piaggio | | H04M 3/5141 |
| 11,151,125 B1 * | 10/2021 | Dwivedi | | G06F 11/3409 |

(Continued)

OTHER PUBLICATIONS

Alessandro Terragni et al. "Optimizing Customer Journey Using Process Mining and Sequence-Aware Recommendation" SAC '19, Apr. 8-12, 2019, Limassol, Cyprus (Year: 2019).*

(Continued)

*Primary Examiner* — Naeem U Haq
(74) *Attorney, Agent, or Firm* — F. CHAU & ASSOCIATES, LLC

(57) ABSTRACT

Systems and methods for customer journey optimization are described. One or more aspects of the systems and methods include displaying a workflow canvas including a representation of a customer journey corresponding to a digital content channel, wherein the customer journey comprises an ordered sequence of event definitions; displaying the digital content channel within the customer journey user interface; monitoring user interactions with digital content channel; receiving an event payload generated in response to a user interaction with the digital content channel based on the monitoring, wherein the event payload comprises event data describing the user interaction; generating an event definition based on the event data from the event payload, wherein the event definition defines a category of user interaction events on the digital content channel; adding the event definition to the customer journey; and displaying a representation of the customer journey including a visual representation of the added event definition.

20 Claims, 13 Drawing Sheets

(56) References Cited

U.S. PATENT DOCUMENTS

| | | | |
|---|---|---|---|
| 11,200,485 B2 * | 12/2021 | Friio | G06N 3/084 |
| 11,269,908 B2 * | 3/2022 | Beringer | G06F 16/248 |
| 11,451,668 B2 * | 9/2022 | Piaggio | G06Q 30/0201 |
| 11,550,849 B2 * | 1/2023 | Beringer | G06F 16/287 |
| 11,689,663 B2 * | 6/2023 | Piaggio | H04M 3/5141 |
| | | | 379/265.09 |
| 11,829,746 B1 * | 11/2023 | Dwivedi | G06F 8/65 |
| 2006/0074714 A1 | 4/2006 | Aziz et al. | |
| 2021/0334819 A1 | 10/2021 | Hayes et al. | |

OTHER PUBLICATIONS

Office Action dated Oct. 5, 2023 in related U.S. Appl. No. 17/659,198.

\* cited by examiner

SYSTEMS AND METHODS FOR CUSTOMER JOURNEY OPTIMIZATION

BACKGROUND

The following relates generally to information technology, and more specifically to customer journey optimization. Conventional customer journey authoring systems and methods can leverage data gathered over the course of a customer journey to further tailor the customer journey to best meet the customer's needs and expectations.

However, conventional customer journey authoring systems and methods currently require a significant investment of time and labor on the part of the entity authoring the customer journey. There is therefore a need in the art for a method of optimizing the authoring and modification of customer journeys.

SUMMARY

Embodiments of the present disclosure optimize the authoring of customer journeys by automatically adding event definitions to a customer journey as they occur based on interactions with a digital content channel from an authoring user and/or a customer for whom the journey is being authored. By automatically adding the events based on user interactions, embodiments of the present disclosure provide an intuitive and simple customer journey authoring process that avoids manual programming of the events into the customer journey, reducing time and effort on the part of the user.

A method, apparatus, non-transitory computer readable medium, and system for customer journey optimization are described. One or more aspects of the method, apparatus, non-transitory computer readable medium, and system include displaying, by a customer journey user interface of a workflow orchestration platform, a workflow canvas including a representation of a customer journey corresponding to a digital content channel, wherein the customer journey comprises an ordered sequence of event definitions; displaying the digital content channel within the customer journey user interface; monitoring, by an event listener component, user interactions with digital content channel; receiving, by the event listener component, an event payload generated in response to a user interaction with the digital content channel based on the monitoring, wherein the event payload comprises event data describing the user interaction; generating, by an event curator component of the workflow orchestration platform, an event definition based on the event data from the event payload, wherein the event definition defines a category of user interaction events on the digital content channel; adding, by a workflow generation component of the workflow orchestration platform, the event definition to the customer journey; and displaying, via the customer journey user interface, a representation of the customer journey including a visual representation of the added event definition.

A method, apparatus, non-transitory computer readable medium, and system for customer journey optimization are described. One or more aspects of the method, apparatus, non-transitory computer readable medium, and system include displaying, by a customer journey user interface of a workflow orchestration platform, a workflow canvas including a representation of a customer journey corresponding to a digital content channel, wherein the customer journey comprises an ordered sequence of event definitions; receiving, by the workflow orchestration platform, a user command to initiate a tracking mode; displaying, by the workflow orchestration platform, the digital content channel within the customer journey user interface based on the tracking mode; monitoring, by an event listener component, user interactions with the digital content channel based on the tracking mode; generating, by an event curator component, an event definition based on the user interactions on a digital content channel, wherein the event definition defines a category of user interaction events on the digital content channel; adding, by a workflow generation component, the event definition to a customer journey associated with the digital content channel, wherein the customer journey comprises an ordered sequence of event definitions; receiving, by an event listener component, event data by monitoring events on the digital content channel for a target customer associated with the customer journey; and updating, by the workflow generation component, the customer journey for the target customer based on the event data.

An apparatus and system for customer journey optimization are described. One or more aspects of the apparatus and system include a user interface configured to display a digital content channel and a representation of a customer journey associated with the digital content channel; an event listener service configured to receive event data by monitoring user interactions on the digital content channel; an event curator service configured to generate an event definition based on the event data, wherein the event definition defines a category of user interaction events on the digital content channel; and a workflow generation component configured to add the event definition to a customer journey associated with the digital content channel, wherein the customer journey comprises an ordered sequence of event definitions.

DETAILED DESCRIPTION

Figure 1:
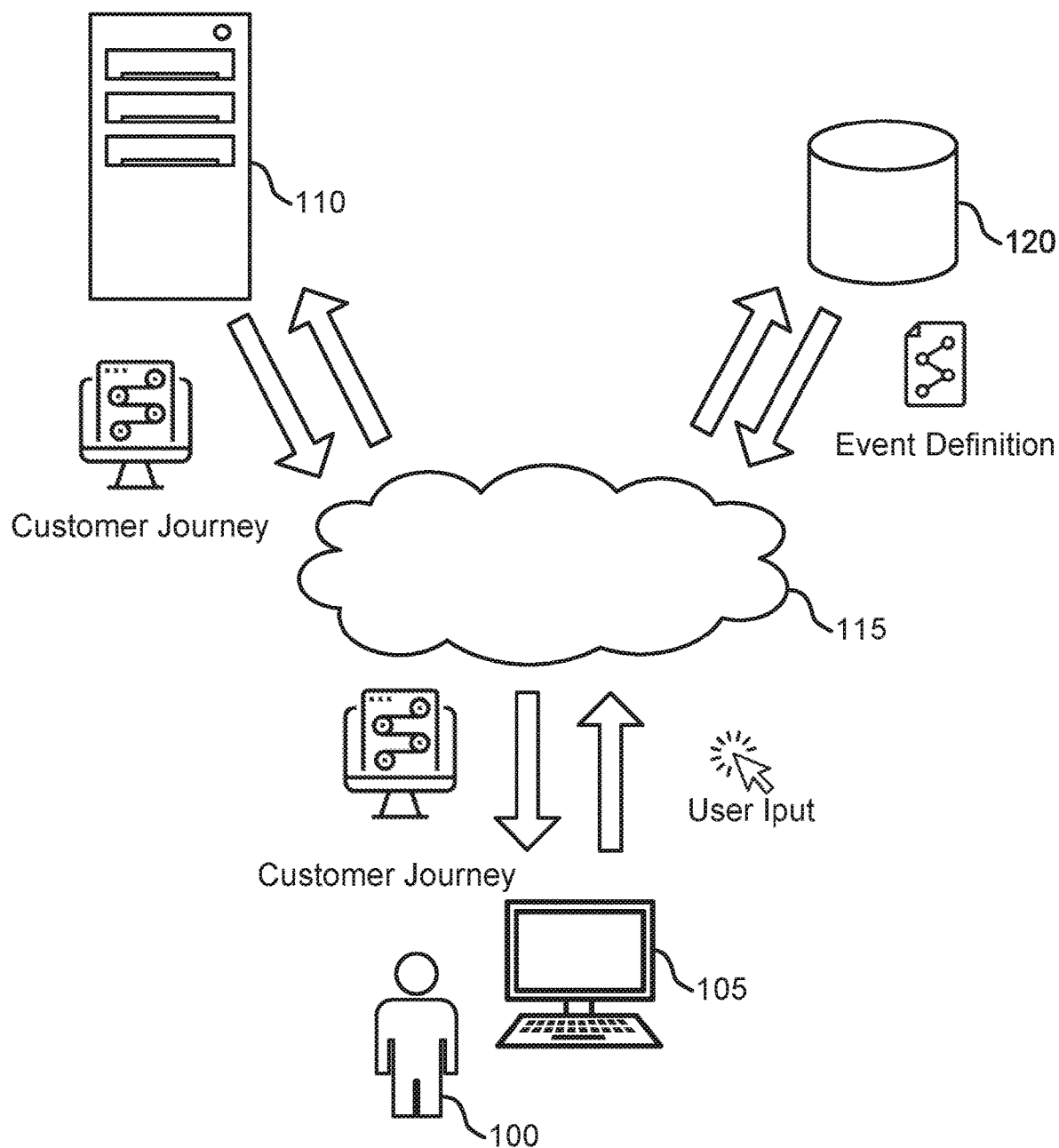
FIG. 1 shows an example of a customer journey optimization system according to aspects of the present disclosure.

A customer journey refers to a series of customer interactions ("events") with an entity over time. For example, a customer journey can begin when a customer visits a brand's digital content channel, such as a website. The customer journey may then include information describing the interaction of the customer and the brand (for example, subsequent visits to other digital content channels run by the brand, account registrations, purchases made, messages sent and received, etc.). Conventional customer journey orchestration systems and methods can leverage data gathered over the course of a customer journey to further tailor the customer journey to best meet the customer's needs and expectations.

However, conventional customer journey orchestration systems and methods currently require a significant time investment on the part of the entity authoring the customer journey. For example, multiple hours can be spent on creating schemas and event payloads from those schemas. A similar amount of time can be spent on configuring actions and data sources for required use-cases. Furthermore, descriptions of customer journey events, and causal relationships between the customer journey events, may need to be manually programmed by the customer journey author. Eventually, after these components are combined on a user interface to present to the authoring user, a great deal of effort may then be spent on testing that a sent payload is correct and that events in the customer journey are triggered when the payload is sent; or, in other words, verifying that an event payload is in-sync with an authored event definition. There is therefore a need in the art for a method of optimizing the authoring of customer journeys.

The present disclosure provides systems and methods for customer journey optimization. In at least one embodiment, a customer journey optimization apparatus includes an event listener component configured to receive event data by monitoring user interactions on a digital content channel. The customer journey optimization apparatus also includes an event curator component configured to generate an event definition based on the event data. The event definition defines a category of user interaction events on the digital content channel. Furthermore, the customer journey optimization apparatus also includes a workflow generation component configured to add the event definition to a customer journey associated with the digital content channel.

Systems and methods according to the present disclosure thereby optimize the creation and modification of customer journeys by reducing the effort needed to author an event. For example, by receiving event data using the event listener component, generating an event definition based on the event data using the event curator component, and adding the event definition to a customer journey using the workflow generation component, the user avoids manually entering the event data and event definitions as text themselves, and instead can interactively author a customer journey by interacting with the digital content channel.

For example, in at least one embodiment, a customer journey interface of the customer journey optimization apparatus prompts the user to associate an authoring session with a customer identifier and a digital content channel identifier, such that the customer journey optimization apparatus is able to associate user interactions on the digital content channel in the authoring session with the customer for whom the customer journey is being authored. Then, during the authoring session, rather than programming an event definition of "Shopping Cart Visit", the user can simply visit the digital content channel and click on a shopping cart button, icon, etc.

An event listener component of the customer journey optimization apparatus receives event data from the digital content channel corresponding to the click, such as an event identifier, the customer identifier, and a configuration identifier corresponding to a status of the digital content channel. The event listener component provides the event data to an event curator component of the customer journey apparatus. The event curator component generates an event definition (including an event type and the identifier for the digital content channel) based on the event data. A workflow generation component then adds the event definition to the customer journey, and a customer journey user interface displays a representation of the customer journey based on the added event definition to the user.

The customer journey includes an ordered sequence of event definitions. In at least one embodiment, the configuration identifier of the event definition includes a visit-based variable that includes information corresponding to the state of the digital content channel, thereby providing a context of the digital content channel for the workflow generation component to place the event definition in the ordered series.

Therefore, in an example, the customer journey optimization apparatus allows the user to intuitively add an event definition for "Shopping Cart Visit" to an ordered series of event definitions in the customer journey by clicking on a shopping cart icon, rather than manually programming the event definition, and also allows the user to view the customer journey that includes the "Shopping Cart Visit" event definition in the same user interface that is used to author the customer journey.

Furthermore, according to some aspects, the customer journey optimization apparatus updates a customer journey user interface to display visual elements representing the event definitions added to the customer journey, providing the user with a convenient and real-time display of the ordered sequence of event definitions that comprise the customer journey, further reducing time and difficulty in conceptualizing the customer journey.

Additionally, according to some aspects, the customer journey optimization apparatus initiates a tracking session in response to a user input, where the customer journey optimization apparatus monitors user interactions on the digital content channel based on the tracking session. According to some aspects, the tracking session is initiated in response to a user input to a customer journey user interface. The customer journey user interface provides the user with a convenient and fast method of determining when event definitions should be added to the customer journey, further optimizing the authoring process of a customer journey. In some embodiments, the digital content channel is displayed in a tracking window associated with the tracking session, eliminating time a user would spend transferring between a browser view of the digital content channel and the customer journey user interface.

Still further, according to some aspects, the customer journey optimization apparatus reduces time and effort in testing a customer journey by validating the customer journey based on a test interaction, allowing a user to test event occurrences without leaving the customer journey user interface.

The term "digital content channel" refers to a channel, such as a website, through which a customer interacts with an entity, such as a brand, a company, etc.

The term "event data" refers to information associated with a user interaction event on a digital content channel. According to some aspects, event data includes an event identifier (e.g., a description of an event such as "Shopping Cart Visit"), a customer identifier (such as an email associated with a registered customer account), and a configuration identifier (such as a visit-based variable for the digital content channel and the customer that acts similarly to a cookie, and provides the customer journey optimization apparatus with information to help the apparatus update an event definition).

The term "user interactions" refers in some cases to interactions with the digital content channel by a user authoring the customer journey. In these cases, the user can effectively author a customer journey for a customer by interacting with the digital content channel after providing the customer identifier to the customer journey apparatus. In some cases, "user interactions" refers to interactions with the digital content channel by the customer for whom the customer journey is being authored. In this case, any interactions with the digital content channel by a customer logged in to the channel with the customer identifier is recorded as a "user interaction", and the authoring user effectively leverages the customer journey optimization apparatus so that the customer themselves provide the information for adding and editing the event definitions for the customer journey.

The term "event definition" refers to information that, taken together with event data, identifies discrete events in a customer journey. In some embodiments, "event definition" includes an event type that defines a category of user interaction events by identifying a schema that should be used for recording the user interaction event, such as a rule-based event schema or a system-based event schema. In some embodiments, "event definition" includes an identifier for the digital content channel, such as a URL.

Figure 3:
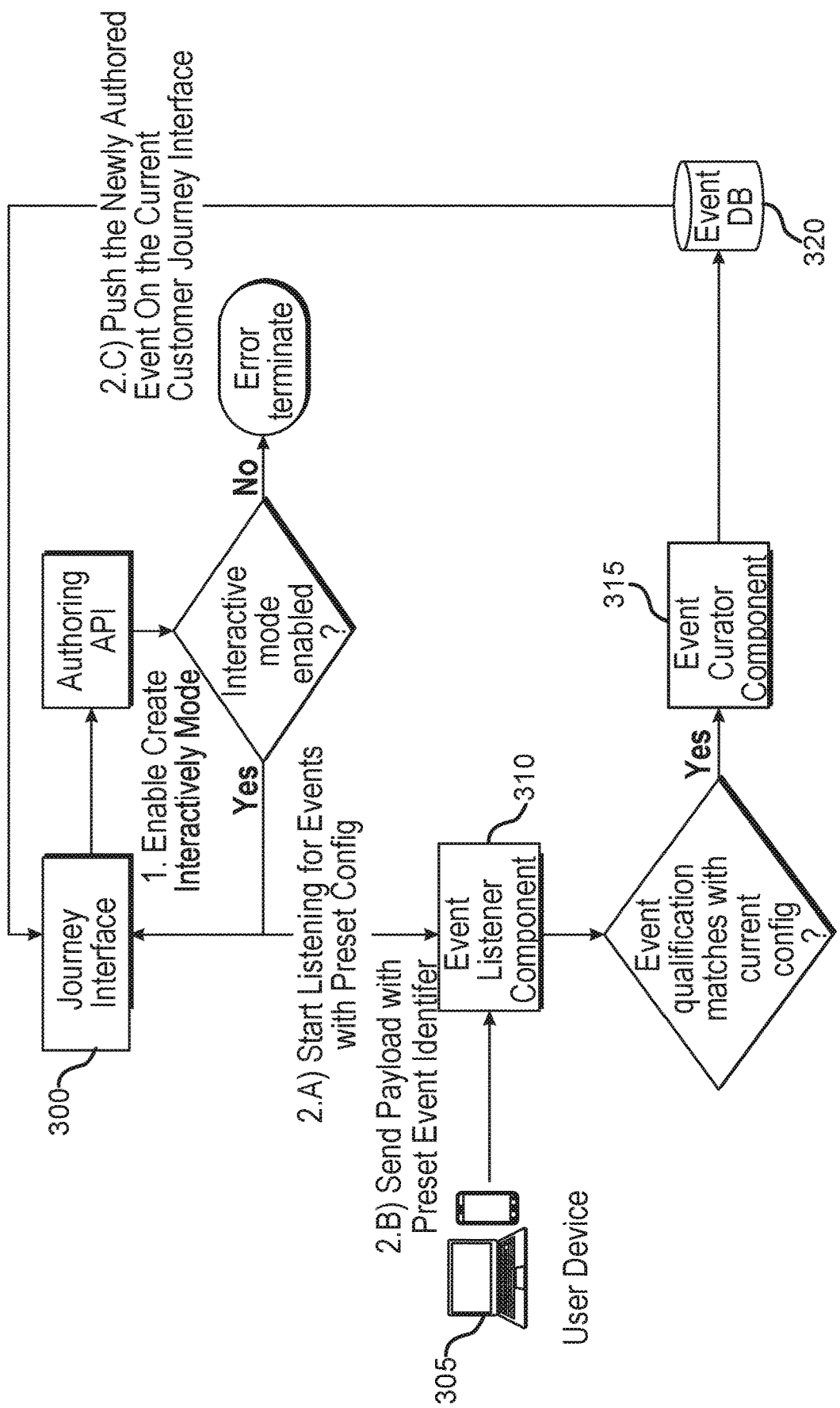
FIG. 3 shows an example of a customer journey database integration according to aspects of the present disclosure.
Figure 4:
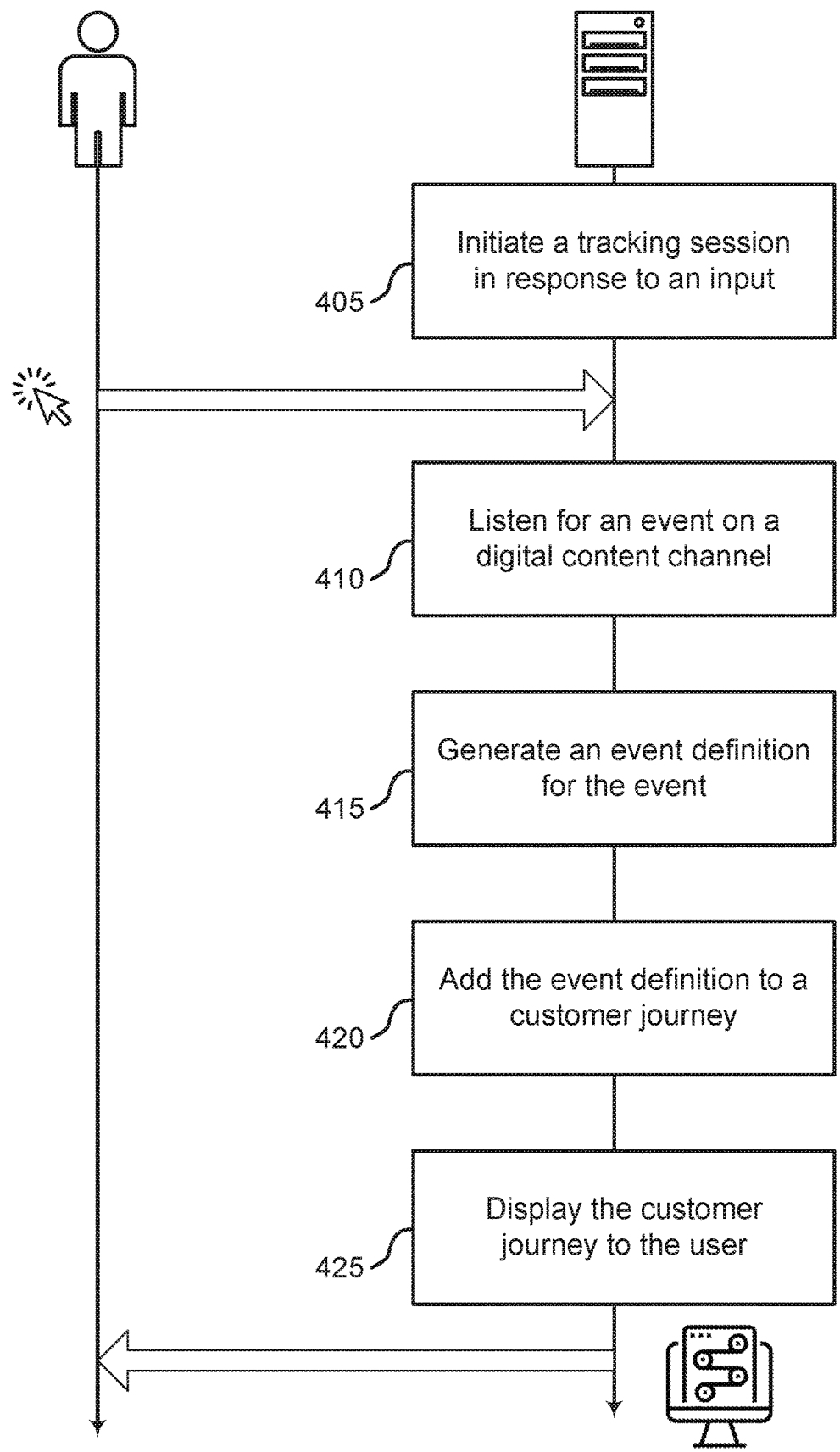
FIG. 4 shows an example of a method customer journey optimization according to aspects of the present disclosure.

An example application of the present disclosure in a customer journey authoring context is provided with reference to FIGS. 1 and 4. Details regarding the architecture of a customer journey optimization system are provided with reference to FIGS. 1-3. Examples of a process for customer journey optimization are provided with reference to FIGS. 4-12. Examples of a process for updating a customer journey for a target customer are provided with reference to FIG. 13.

Customer Journey Optimization System

Figure 2:
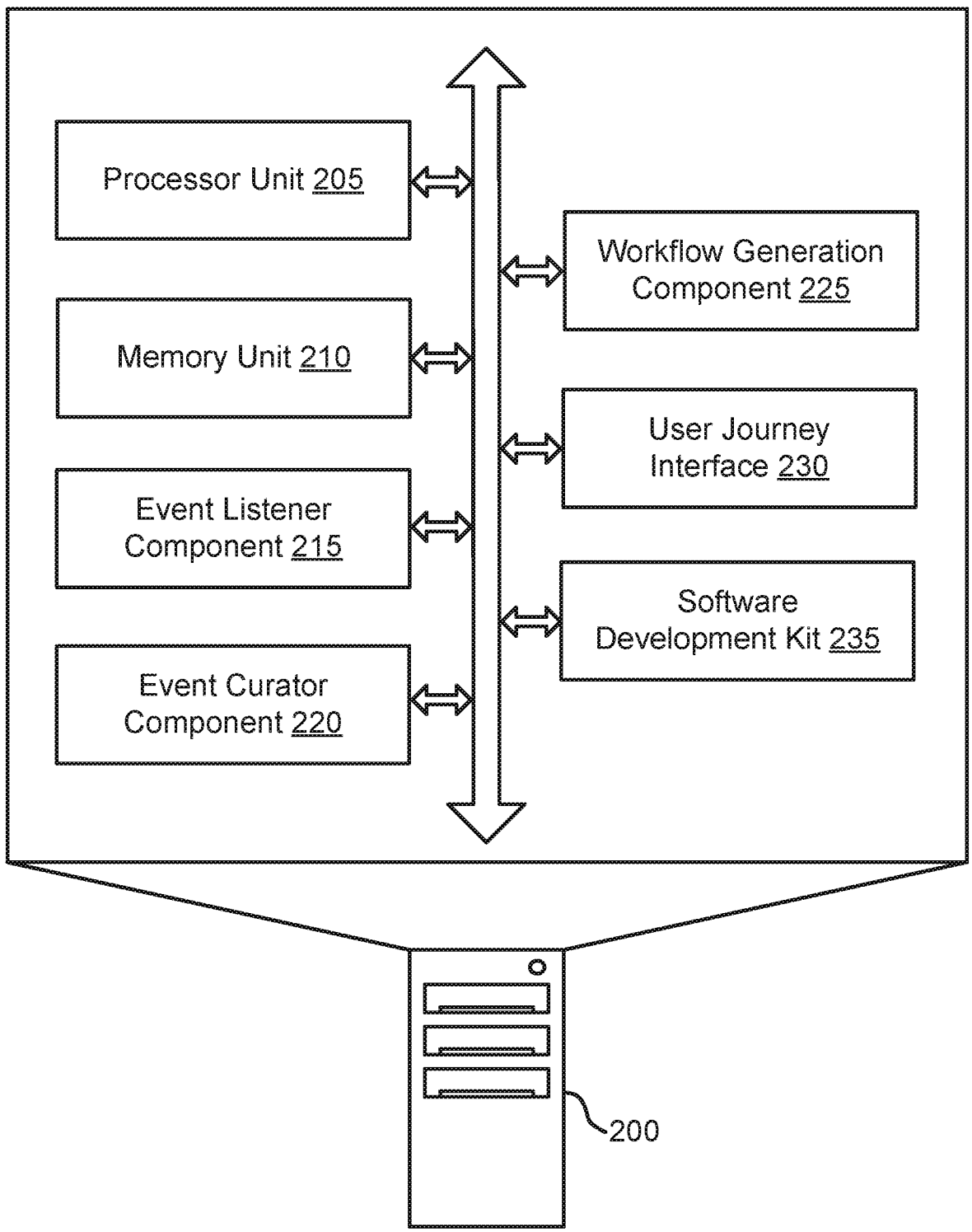
FIG. 2 shows an example of a customer journey optimization apparatus according to aspects of the present disclosure.

In FIGS. 1-3, a system and apparatus for customer journey optimization is described. One or more aspects of the system and apparatus include an event listener component configured to receive event data by monitoring user interactions on a digital content channel; an event curator component configured to generate an event definition based on the event data, wherein the event definition defines a category of user interaction events on the digital content channel; and a workflow generation component configured to add the event definition to a customer journey associated with the digital content channel, wherein the customer journey comprises an ordered sequence of event definitions. Some examples of the system and apparatus further include a customer journey user interface configured to display a visual element representing the event definition.

FIG. 1 shows an example of a customer journey optimization system according to aspects of the present disclosure. The example shown includes user 100, user device 105, customer journey optimization apparatus 110, cloud 115, and database 120.

Referring to FIG. 1, according to some aspects, user 100 uses customer journey optimization apparatus 110 in a customer journey authoring context to automatically add event definitions to a customer journey without manually programming the customer journey. For example, user 100 interacts with customer journey optimization apparatus 110 via user device 105 and cloud 115. Via a customer journey user interface of customer journey optimization apparatus 110 displayed on user device 105, user 100 identifies a customer and a digital content channel (such as a website) for which the customer journey is to be added or edited. Based on a user input, customer journey optimization apparatus 110 monitors user interactions on the digital content channel and receives event data based on the user interactions. In some cases, the user interactions are interactions with the digital content channel by user 100 authoring the customer journey. In these cases, customer journey optimization apparatus 110 allows user 100 to provide event data by interacting with the digital content channel, rather than manually entering the event data as text. In other cases, the user interaction is an interaction with the digital content channel by the customer for whom the customer journey is being authored. In these cases, a customer who is logged in to the digital content channel provides the event data for the customer journey themselves by interacting with the digital content channel.

Figure 7:
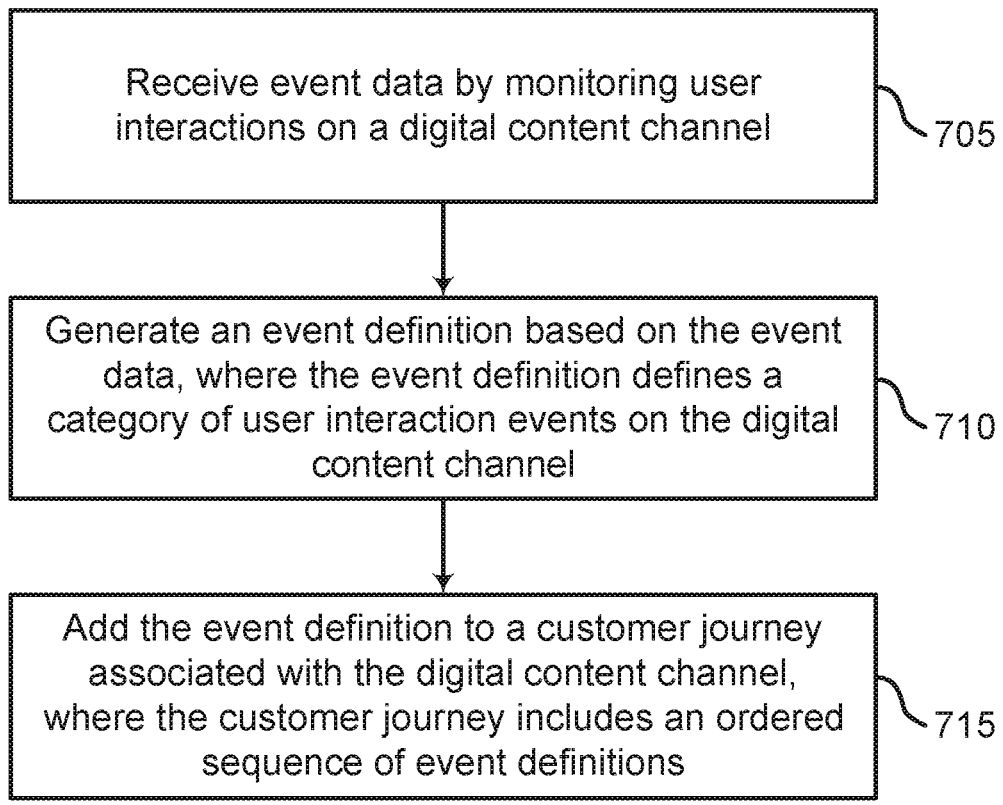
FIG. 7 shows an example of adding an event definition to a customer journey according to aspects of the present disclosure.

After customer journey optimization apparatus 110 receives the event data, customer journey optimization apparatus 110 generates an event definition based on the event data, wherein the event definition defines a category of user interaction events on the digital content channel, and adds the event definition to a customer journey associated with the digital content channel, wherein the customer journey comprises an ordered sequence of event definitions, as described with reference to FIG. 7. According to some aspects, customer journey optimization apparatus 110 then displays the customer journey to user 100 via the customer journey user interface displayed on user device 105.

In some embodiments, user device 105 is a personal computer, laptop computer, mainframe computer, palmtop computer, personal assistant, mobile device, or any other suitable processing apparatus. In some examples, user device 105 includes software that can display a customer journey user interface and receive and provide user interaction with the customer journey user interface. User device 105 is an example of, or includes aspects of, the corresponding element described with reference to FIG. 3.

In some embodiments, a user interface enables user 100 to interact with user device 105 and/or customer journey optimization apparatus 110. In some embodiments, the user interface includes an audio device, such as an external speaker system, an external display device such as a display screen, or an input device (e.g., a remote control device interfaced with the user interface directly or through an IO controller module). In some cases, the user interface is a graphical user interface (GUI). In some cases, the GUI is implemented as the customer journey user interface of the customer journey optimization apparatus as described with reference to FIG. 2, and the customer journey optimization apparatus displays the customer journey user interface on user device 105.

In some embodiments, customer journey optimization apparatus 110 also includes one or more processors, a memory subsystem, a communication interface, an 110 interface, one or more user interface components, and a bus. Additionally, in some embodiments, customer journey optimization apparatus 110 communicates with user device 105 and database 120 via cloud 115.

In some cases, customer journey optimization apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, a server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Further detail regarding the architecture of customer journey optimization apparatus 110 is provided with reference to FIGS. 2-3. Further detail regarding a process for optimizing a customer journey using customer journey optimization apparatus 110 is described with reference to FIGS. 4-12. Further detail regarding a process for updating a customer journey for a target customer is described with reference to FIG. 13. Customer journey optimization apparatus 110 is an example of, or includes aspects of, the corresponding element described with reference to FIG. 2.

A cloud such as cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. In some aspects, cloud 115 provides communications between user device 105, customer journey optimization apparatus 110, and database 120.

A database such as database 120 is an organized collection of data. For example, database 120 stores data in a specified format known as a schema. In some embodiments, database 120 is structured as a single database, a distributed database, multiple distributed databases, or an emergency backup database. In some embodiments, a database controller manages data storage and processing in database 120. In some cases, user 100 interacts with the database controller. In other cases, the database controller operates automatically without user interaction. stores. In some cases, database 120 stores event definitions, event data, and other data relating to user interactions. In some cases, database 120 stores a rule-based data schema relating to event types of the user interaction events. Database 120 is an example of, or includes aspects of, the corresponding element described with reference to FIG. 3.

FIG. 2 shows an example of a customer journey optimization apparatus 200 according to aspects of the present disclosure. Customer journey optimization apparatus 200 is an example of, or includes aspects of, the corresponding element described with reference to FIG. 1. In one aspect, customer journey optimization apparatus 200 includes processor unit 205, memory unit 210, event listener component 215, event curator component 220, workflow generation component 225, customer journey user interface 230, and software development kit 235.

Processor unit 205 includes one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 contains, among other things, a basic input/output system (BIOS) which controls basic hardware or software operation such as the interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, event listener component 215 receives event data by monitoring user interactions on a digital content channel. In some examples, event listener component 215 initiates a tracking session, where the user interactions are monitored based on the tracking session. In some aspects, the event data includes an event identifier, a customer identifier, and a configuration identifier.

In some examples, event listener component 215 initiates a test mode. In some examples, event listener component 215 monitors a test interaction on the digital content channel based on the test mode. In some examples, event listener component 215 detects a status of the digital content channel at a time of the user interactions, where the event definition is generated based on the status of the digital content channel. In some examples, event listener component 215 identifies a state of the digital content channel.

According to some aspects, event listener component 215 integrates the digital content channel with a workflow orchestration platform via a software development kit (SDK), where the monitoring is based on the SDK. An SDK is a set of tools that assist developers in creating software or applications for a platform, operating system, computer system, or computing device. An SDK may include libraries or application program interfaces (APIs), e.g., code that assists developers in common programming assignments on the platform. An SDK may also include tools for running and testing software and code. According to some aspects, the SDK includes tools that track user interactions on a digital content channel (such as time spent on the digital content channel and associated digital content channels, cursor and scrolling movement, hyperlink clicks, purchases, other digital content channels visited before and after the digital content channel, etc.). According to some aspects, the SDK is implemented as a software component.

According to some aspects, the workflow orchestration platform is a backend platform that works with the SDK and the digital content channel to record information provided by the integrated digital content channel (such as user interactions). According to some aspects, the workflow orchestration platform is implemented as a server. According to some aspects, the workflow orchestration platform is implemented as a distributed network of servers (e.g., a cloud).

According to some aspects, event listener component 215 is configured to receive event data by monitoring user interactions on a digital content channel. Event listener component 215 is an example of, or includes aspects of, the corresponding element described with reference to FIG. 3. According to some aspects, event listener component 215 is implemented as one or more hardware circuits, in firmware, or as software components.

According to some aspects, event curator component 220 generates an event definition based on the event data, where the event definition defines a category of user interaction events on the digital content channel. In some aspects, the event definition includes an event type and an identifier of the digital content channel. In some examples, event curator component 220 validates the customer journey based on the test interaction.

According to some aspects, event curator component 220 generates an event definition based on user interactions on a digital content channel, where the event definition defines a category of user interaction events on the digital content channel. In some aspects, the event definition includes an event type and an identifier of the digital content channel.

In some examples, event curator component 220 compares the event definition and the event data. In some examples, event curator component 220 determines that the event data matches the category defined by the event definition based on the comparison, where the customer journey is updated based on the determination.

In some examples, event curator component 220 determines that the state of the digital content channel matches the event data.

According to some aspects, event curator component 220 is configured to generate an event definition based on the event data, wherein the event definition defines a category of user interaction events on the digital content channel. Event curator component 220 is an example of, or includes aspects of, the corresponding element described with reference to FIG. 3. According to some aspects, event curator component 220 is implemented as one or more hardware circuits, in firmware, or as software components.

According to some aspects, workflow generation component 225 adds the event definition to a customer journey associated with the digital content channel, where the customer journey includes an ordered sequence of event definitions. In some examples, workflow generation component 225 selects the customer journey from a set of customer journeys, where the event definition is added to the customer journey based on the selection. In some examples, workflow generation component 225 updates a customer journey user interface 230 with a visual element representing the event definition. In some examples, workflow generation component 225 updates the event definition based on user input.

In some examples, workflow generation component 225 receives an event removal instruction. In some examples, workflow generation component 225 removes the event definition from the customer journey in response to the event removal instruction.

According to some aspects, workflow generation component 225 adds the event definition to a customer journey associated with the digital content channel, where the customer journey includes an ordered sequence of event definitions. In some examples, workflow generation component 225 updates the customer journey for the target customer based on the event data. In some examples, workflow generation component 225 selects the customer journey from a set of customer journeys, where the event definition is added to the customer journey based on the selection.

According to some aspects, workflow generation component 225 is configured to add the event definition to a customer journey associated with the digital content channel, wherein the customer journey comprises an ordered sequence of event definitions. Workflow generation component 225 is an example of, or includes aspects of, the corresponding element described with reference to FIG. 3. According to some aspects, workflow generation component 225 is implemented as one or more hardware circuits, in firmware, or as software components.

According to some aspects, customer journey user interface 230 provides a visual element for selecting the tracking session. In some examples, customer journey user interface 230 receives a user interaction with the visual element, where the tracking session is initiated in response to the user interaction. In some examples, customer journey user interface 230 displays the digital content channel in a tracking window associated with the tracking session, where the user interactions are monitored based on the digital content channel being displayed in the tracking window.

In some examples, customer journey user interface 230 displays a user-editable field corresponding to the event definition. In some examples, customer journey user interface 230 receives user input for the user-editable field.

According to some aspects, customer journey user interface 230 is configured to display a visual element representing the event definition. Customer journey user interface 230 is an example of, or includes aspects of, the corresponding element described with reference to FIGS. 5, and 9-11. According to some aspects, customer journey user interface 230 is implemented as the graphical user interface described with reference to FIG. 1. According to some aspects, customer journey optimization apparatus 200 includes a display, and customer journey user interface 230 is displayed via the display. According to some aspects, customer journey user interface 230 is displayed via a display included in a user device such as the user device described with reference to FIG. 1, and customer journey user interface 230 allows a user to interact with customer journey optimization apparatus 200 via user inputs to customer journey user interface 230.

FIG. 3 shows an example of a customer journey database integration according to aspects of the present disclosure. The example shown includes customer journey user interface 300, user device 305, event listener component 310, event curator component 315, and database 320.

Referring to FIG. 3, in at least one embodiment, at step 1, a user (e.g., a user authoring a customer journey for a customer) interacts with customer journey user interface 300 to enable a "create interactively" mode (e.g., a tracking session). Customer journey user interface 300 notifies an authoring API, such as an API included in a software development kit (SDK) described with reference to FIG. 2., of the user interaction to enable the create interactively mode, and tools associated with the SDK and the authoring API either begin tracking user interactions on a digital content channel or terminate if there is an error. At step 2A, event listener component 310 begins listening for event with a preset configuration (e.g., receiving event data by monitoring user interactions on the digital content channel) as described with reference to FIG. 7. According to some aspects, the user interactions are received from user device 305 (e.g., a device used by the user authoring the customer journey for the customer). According to some aspects, the user interactions are received from a customer device (e.g., a device used by the customer for whom the customer journey is being authored). Event curator component 315 then determines if the event qualification for the customer journey matches a current configuration (e.g., if the event data matches a category defined by an event definition) as described with reference to FIG. 7. If event curator component 315 determines that the event qualification matches a current configuration, event curator component 315 saves the event definition and the event data in database 320.

Customer journey user interface 300 is an example of, or includes aspects of, the corresponding element described with reference to FIGS. 2, 5, and 9-11. User device 305 is an example of, or includes aspects of, the corresponding element described with reference to FIG. 1. Event listener component 310 is an example of, or includes aspects of, the corresponding element described with reference to FIG. 2. Event curator component 315 is an example of, or includes aspects of, the corresponding element described with reference to FIG. 2. Database 320 is an example of, or includes aspects of, the corresponding element described with reference to FIG. 1.

Customer Journey Optimization

In FIGS. 4-12, a method for customer journey optimization is described. One or more aspects of the method include receiving event data by monitoring user interactions on a digital content channel; generating an event definition based on the event data, wherein the event definition defines a category of user interaction events on the digital content channel; and adding the event definition to a customer journey associated with the digital content channel, wherein the customer journey comprises an ordered sequence of event definitions. In some aspects, the event data includes an event identifier, a customer identifier, and a configuration identifier. In some aspects, the event definition includes an event type and an identifier of the digital content channel.

Some examples of the method further include selecting the customer journey from a plurality of customer journeys, wherein the event definition is added to the customer journey based on the selection. Some examples of the method further include initiating a tracking session, wherein the user interactions are monitored based on the tracking session.

Some examples of the method further include providing a visual element for selecting the tracking session. Some examples further include receiving a user interaction with the visual element, wherein the tracking session is initiated in response to the user interaction. Some examples of the method further include displaying the digital content channel in a tracking window associated with the tracking session, wherein the user interactions are monitored based on the digital content channel being displayed in the tracking window.

Some examples of the method further include updating a customer journey user interface with a visual element representing the event definition. Some examples of the method further include integrating the digital content channel with a workflow orchestration platform via a software development kit (SDK), wherein the monitoring is based on the SDK.

Some examples of the method further include displaying a user-editable field corresponding to the event definition. Some examples further include receiving user input for the user-editable field. Some examples further include updating the event definition based on user input.

Some examples of the method further include receiving an event removal instruction. Some examples further include removing the event definition from the customer journey in response to the event removal instruction.

Some examples of the method further include initiating a test mode. Some examples further include monitoring a test interaction on the digital content channel based on the test mode. Some examples further include validating the customer journey based on the test interaction.

Some examples of the method further include detecting a status of the digital content channel at a time of the user interactions, wherein the event definition is generated based on the status of the digital content channel.

FIG. 4 shows an example of a method customer journey optimization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, a user uses the customer journey optimization system to author and/or update a customer journey for a customer by prompting the system to monitor user interactions on a digital content channel, such as a website, and generate an event definition corresponding to each user interaction. The user interactions may be interactions from the user that correspond to the customer by selecting a customer identifier for the customer before the interactions are made, or may be interactions from the customer, and are identified with the customer based on the customer being logged in to the digital content channel with the customer identifier. The customer journey optimization system adds the event definitions to the customer journey and displays the customer journey to the user, thereby saving the user the time and expense of manually programming the customer journey.

At operation 405, the system initiates a tracking session. In some cases, the operations of this step refer to, or may be performed by, a customer journey optimization apparatus as described with reference to FIG. 2. In an example, an event listener component of the customer journey apparatus initiates the tracking session as described with reference to FIG. 8.

At operation 410, the system listens for an event on a digital content channel in response to the tracking session. In some cases, the operations of this step refer to, or may be performed by, a customer journey optimization apparatus as described with reference to FIG. 2. In an example, an event listener component listens for the event on the digital content channel as described with reference to FIG. 7.

At operation 415, the system generates an event definition for the event. In some cases, the operations of this step refer to, or may be performed by, a customer journey optimization apparatus as described with reference to FIG. 2. In an example, an event curator component of the customer journey optimization apparatus generates an event definition as described with reference to FIG. 7.

At operation 420, the system adds the event definition to a customer journey. In some cases, the operations of this step refer to, or may be performed by, a customer journey optimization apparatus as described with reference to FIG. 2. In an example, a workflow generation component of the customer journey optimization apparatus adds the event definition to the customer journey as described with reference to FIG. 7.

At operation 425, the system displays the customer journey to the user. In some cases, the operations of this step refer to, or may be performed by, a customer journey optimization apparatus as described with reference to FIG. 2. In an example, a customer journey user interface displays the customer journey to the user as described with reference to FIG. 7.

Figure 5:
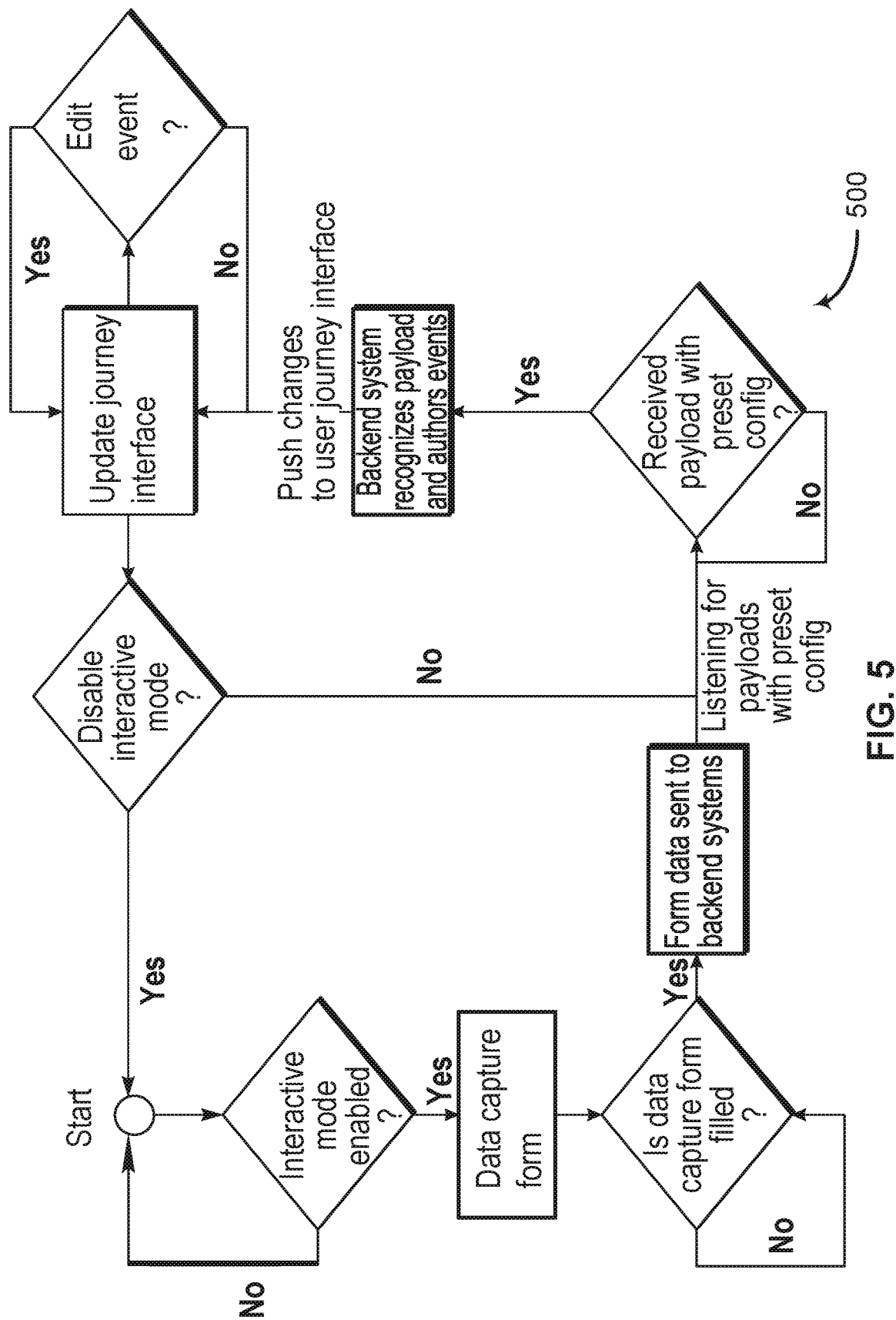
FIG. 5 shows an example of a user experience according to aspects of the present disclosure.

FIG. 5 shows an example of a user experience according to aspects of the present disclosure. Customer journey user interface 500 is an example of, or includes aspects of, the corresponding element described with reference to FIGS. 2, and 9-11.

Figure 9:
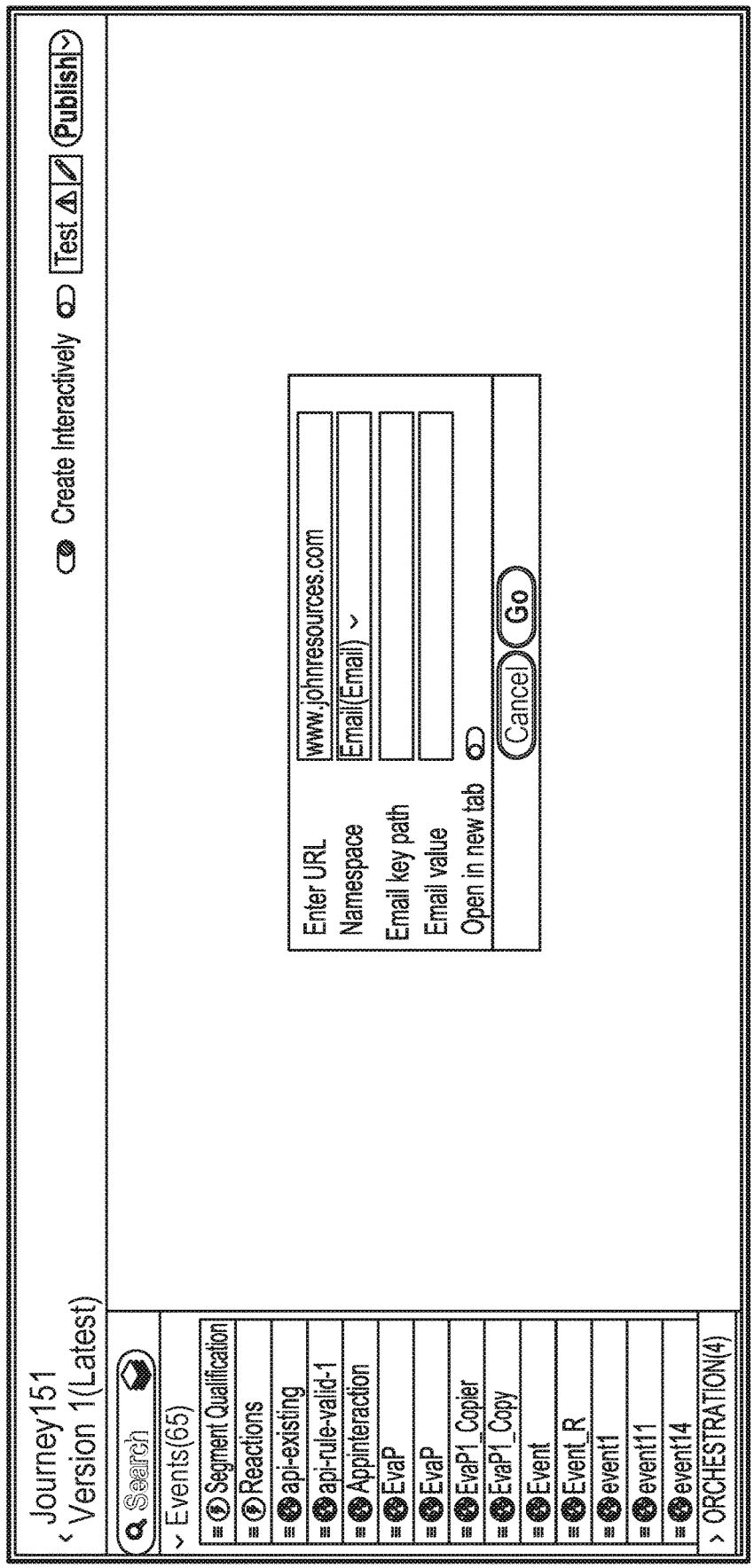
FIG. 9 shows an example of initiating a tracking session according to aspects of the present disclosure.

Referring to FIG. 5, in at least one embodiment, a user of the customer journey optimization system begins by enabling an interactive mode (e.g., a tracking session) in customer journey user interface 500. In response to enabling the interactive mode, customer journey user interface 500 provides a data capture form. An example of the data capture form is illustrated in FIG. 9. After the user fills the information into the form and clicks a button to proceed, data from the form (such as the digital content channel URL and the customer identifier) is provided to the backend systems (e.g., the event listener component, event curator component, and workflow generation component as described with reference to FIG. 2, and/or a database as described with reference to FIG. 1). The event listener component then listens for payloads with a preset configuration (e.g., the event listener component receives event data including a configuration identifier from the digital content channel).

In response to receiving a payload with a preset configuration, the backend system (e.g., the event listener component) recognizes the payload and authors events (e.g., the event curator component generates an event definition based on the event data, and the workflow generation component adds the event definition to the customer journey). The workflow generation component pushes the changes to customer journey user interface 500 (e.g., updates customer journey user interface 500 with a visual element representing the event definition). The user has the option of editing the event definition for the event. The user also has an option of disabling the interactive mode, so that the event listener component stops listening for the payloads.

Figure 6:
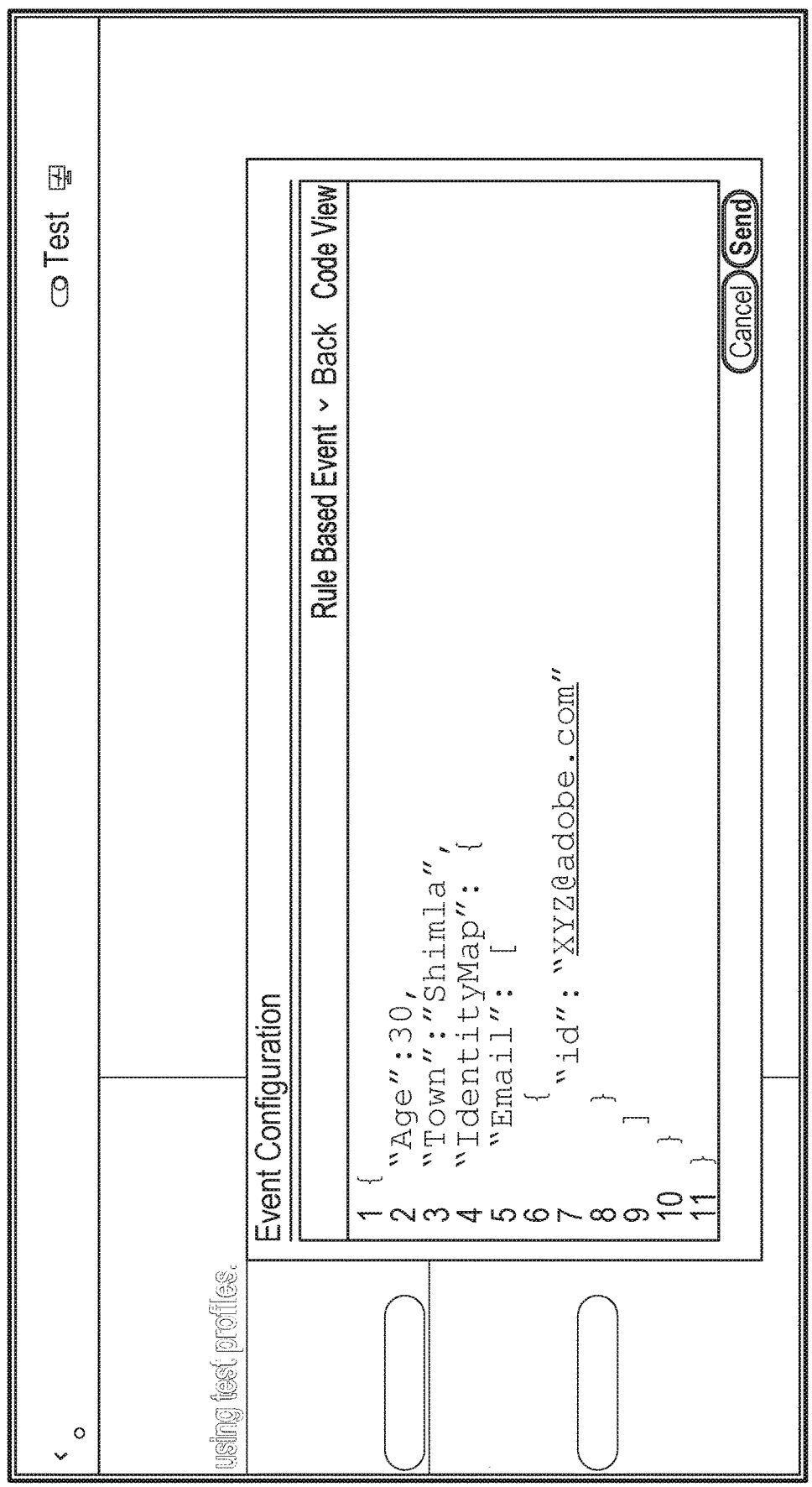
FIG. 6 shows an example of a conventional user experience according to aspects of the present disclosure.

FIG. 6 shows an example of a conventional user experience according to aspects of the present disclosure. As shown in the comparative example of FIG. 6, curating events for customer journeys is a highly specialized and cumbersome task. For example, multiple technical details are needed to author and then test an event, making event authoring a specialized and time-intensive task: an engineer needs to identify a best-suited schema, identify fields for the event, map the field values to their respective schema fields, and eventually test the payload of event. This task needs to be repeated for every event that is to be tracked for a customer journey.

Furthermore, a complicated user interface (UI) workflow may make event authoring a cumbersome process in the comparative example: an engineer may need to go to an admin section of the UI, enter a separate "events section" of the admin section, and interact with the "events section" to go to a menu to create an event. Finally, after specifying all fields as required by the UI and saving an event authoring form, the engineer may have to go back to a different menu to create a customer journey including the created event, or open an existing journey to add the created event to an existing journey.

As shown in the comparative example, conventional customer journey authoring systems leads to a subpar experience, in which navigation between different views on a UI takes a significant amount of time and an engineer may need to know backend-level details for repeatedly testing events to ensure that event payloads work for a triggered event.

FIG. 7 shows an example of adding an event definition to a customer journey according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, a customer journey optimization system automatically generates an event definition based on user interaction with a digital content channel and adds the event definition to a customer journey associated with a digital content channel, avoiding manual population of the customer journey by a user with knowledge of backend technical details, thereby reducing expense, time, and effort spent in authoring the customer journey.

At operation 705, the system receives event data by monitoring user interactions on a digital content channel. In some cases, the operations of this step refer to, or may be performed by, an event listener component as described with reference to FIGS. 2 and 3. For example, in at least one embodiment, the event listener component integrates the digital content channel with a workflow orchestration platform via a software development kit (SDK), wherein the monitoring is based on the SDK. According to some aspects, the SDK includes one or more application programming interfaces (APIs). According to some aspects, the event listener integrates the digital content channel with the workflow orchestration platform upon the approval of the user. Once the digital content channel is integrated with the SDK, the digital content channel uploads user interactions occurring on the digital content channel to a web server or servers (e.g., the workflow orchestration platform). As used herein, the term "user interactions" refers to interactions with the digital content channel from a user who is authoring the customer journey (e.g., the user as described with reference to FIGS. 1-2) and/or interactions with the digital content channel from a customer for whom the customer journey is being authored.

The event listener component then monitors user interactions on the digital content channels via API calls, thereby receiving event data corresponding to the user interactions. For example, the event listener component initiates a request to the API to retrieve the event data. The API then makes a call to the workflow orchestration platform. The workflow orchestration platform then sends a response to the API with the requested information (e.g., the event data corresponding to the user interactions). Finally, the API transfers the event data to the event listener component.

According to some aspects, the event data includes an event identifier, a customer identifier, and a configuration identifier. According to some aspects, event data is assigned to user interaction events that occur as a result of each user interaction via the SDK.

In at least one embodiment, the event identifier is a text description of the user interaction event occurring as a result of the user interaction (e.g., a user interaction of clicking a "shopping cart" button in a shopping cart on the digital content channel results in a "visited shopping cart" event, and the "visited shopping cart" event receives an appropriate predetermined event identifier, such as "Shopping Cart Visit", or a numerical identifier, both of which are known to the customer journey optimization apparatus as being indicative of the event that has occurred and an event category that the event belongs to according to a data schema).

In at least one embodiment, the customer identifier is a name field, such as an email address or other identifier that a customer uses to log in to the digital content channel, that identifies a customer for whom the customer journey is being authored. In cases in which the user interaction is from a user who is authoring the customer journey, the user instructs a workflow generation component via an input to the customer journey user interface to select a customer journey from a plurality of customer journeys displayed in the customer journey user interface before interacting with the digital content channel. Thereafter, the event listener component tags each user interaction with a customer identifier corresponding to the selected customer journey. In cases in which the user interaction is from a customer for whom the customer journey is being authored, the digital content channel tags the user interactions with the customer identifier as a result of the logged-in state of the customer on the digital content channel. Thereafter, the event listener component receives the customer identifier as part of the event data as a result of integration of the digital content channel with the SDK.

In at least one embodiment, the configuration identifier is a representation of the configuration of the digital content channel at the time that the event listener component receives the user interaction on the digital content channel. In at least one embodiment, the configuration identifier is visit-based variable that functions in a similar manner to cookies, where values passed into the variable follow a customer for a predetermined period of time. Values of the variable, and therefore the configuration identifier, can change based on such factors as searches performed on the digital content channel, conversions on the digital content channel, account registrations performed on the digital content channel, etc.

Because the configuration identifier identifies a state of the digital content channel at the time that the event listener component receives the event definition, the configuration identifier provides a context for the workflow generation component to add the event definition to the ordered sequence of event definitions by comparing a configuration identifier with other configuration identifiers included in other event definitions in the ordered sequence. For example, the workflow generation component can identify a first state of the digital content channel corresponding to a first configuration identifier, and determine that a second state of the digital content channel depends on the first state by comparing the first configuration identifier with a second configuration identifier corresponding to the second state. Based on the comparison, the workflow generation component includes a first event definition corresponding to the first configuration identifier as an antecedent event definition in the ordered sequence, and includes a second event definition corresponding to the second event definition as a subsequent event in the ordered sequence. According to some aspects, the configuration identifier of each event definition is thereby used by the workflow generation component to establish or edit event definition sequence dependencies in a data schema associated with the event definitions.

According to some aspects, the event listener component detects a status of the digital content channel at a time of the user interaction, wherein the event curator component generates the event definition based on the status of the digital content channel. For example, in at least one embodiment, the event listener component detects the status of the visit-based variable and passes the value or values of the visit-based variable to the event curator component. The event curator component then includes the visit-based variable in the event definition as the configuration identifier, thereby generating the event definition based on the status of the digital content channel.

According to some aspects, the event listener component initiates a tracking session, wherein the user interactions are monitored based on the tracking session. For example, in at least one embodiment, the tracking session offers a user an ability to control when the event listener component monitors user interactions on the digital content channel. The tracking session is further described with reference to FIG. 8.

At operation 710, the system generates an event definition based on the event data, where the event definition defines a category of user interaction events on the digital content channel. In some cases, the operations of this step refer to, or may be performed by, an event curator component as described with reference to FIGS. 2 and 3. For example, in some aspects, the event listener component passes the event data to the event curator component. The event curator component analyzes the event data and determines an event definition for the user interaction event corresponding to the event data based on information included in the event data. For example, according to some embodiments, the event definition includes an event type and an identifier of the digital content channel.

In some embodiments, the event type defines the category of user interaction events by identifying the schema that should be used for recording the user interaction event, such as a rule-based event schema or a system-based event schema. For example, in a rule-based schema, data schema rules are associated with the event type included in the event data, so that subsequent actions, such as event triggering, occurs when event data including event identifiers corresponding to a particular event type is received. In an example, a rule-based data schema could include a rule such that when the customer journey optimization apparatus receives event data including an event identifier "Shopping Cart Visit", the customer journey apparatus should check to see if a purchase event has been received within a predetermined time period, and if it has not, to send follow-up messages to the customer associated with the customer journey. In some embodiments, the identifier of the digital content channel includes a URL. In some embodiments, the event definition includes the event data.

At operation 715, the system adds the event definition to a customer journey associated with the digital content channel, where the customer journey includes an ordered sequence of event definitions. In some cases, the operations of this step refer to, or may be performed by, a workflow generation component as described with reference to FIGS. 2 and 3. For example, in at least one embodiment, the workflow generation component receives the event definition from the event curator component and adds the event definition to the customer journey associated with the event definition based on an ordered sequence of event definitions. In at least one embodiment, the ordered sequence of event definitions is ordered based on the date and time that the workflow generation component receives the event definition. In at least one embodiment, the ordered sequence of event definitions is ordered based on the event type included in the event definition, where the event type is associated with a rule-based data schema in which the order of event definitions in the customer journey is predetermined according to the data schema.

According to some aspects, the workflow generation component selects the customer journey from a plurality of customer journeys, wherein the event definition is added to the customer journey based on the selection. For example, in cases in which the user interaction is from a user who is authoring the customer journey, the user instructs a workflow generation component via an input to the customer journey user interface to select a customer journey from a plurality of customer journeys displayed in the customer journey user interface at the beginning of a customer journey authoring session. Thereafter, the user interactions correspond to event definitions that correspond in turn to the selected customer journey, and the workflow generation component adds the received event definitions to the selected customer journey.

According to some aspects, the workflow generation component updates the customer journey user interface with a visual element representing the event definition. For example, in at least one embodiment, the workflow generation component instructs the customer journey user interface to display a visual element such as an icon, an image, a button, etc. that represents the event definition. In at least one embodiment, the customer journey user interface displays one or more visual elements, each representing an event definition and the place of the event definition in the ordered sequence of event definitions included in the customer journey. In at least one embodiment, the visual element is interactive, such that a user interaction with the visual element causes the customer journey user interface to display the information included in the event definition. In at least one embodiment, the workflow generation component uses a document object model to push the visual element representing the event definition to the customer journey user interface at runtime. Examples of a visual element representing an event definition are further described with reference to FIGS. 10 and 11.

According to some aspects, the workflow generation component receives an event removal instruction. For example, in at least one embodiment, the customer journey user interface provides an interactive visual element for removing an event definition from the customer journey, and a user interaction with the visual element causes the workflow generation component to receive the event removal instruction. According to some aspects, the workflow generation component removes the event definition from the customer journey in response to the event removal instruction. For example, in at least one embodiment, the workflow generation component removes the event definition from the customer journey by deleting the event definition from the ordered sequence of event definitions included in the customer journey.

Figure 8:
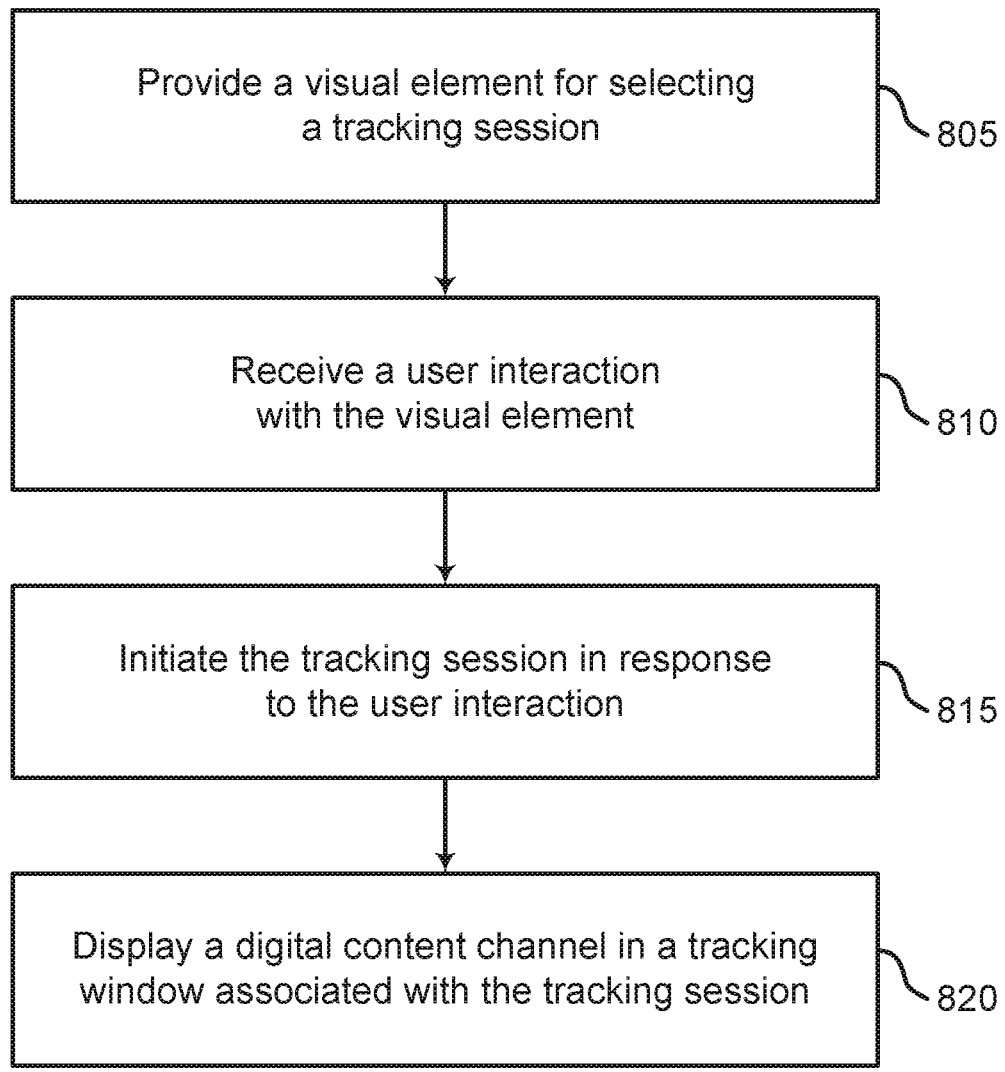
FIG. 8 shows an example of a tracking session according to aspects of the present disclosure.

FIG. 8 shows an example of a tracking session according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, an event tracking session provides a user with an ability to control when the system monitors user interactions on the digital content channel.

At operation 805, the system provides a visual element for selecting a tracking session. In some cases, the operations of this step refer to, or may be performed by, a customer journey user interface as described with reference to FIGS. 2, 5, and 9-11. For example, in at least one embodiment, the visual element is an interactive visual element, such as a toggle, button, drop down menu, etc. In at least one embodiment, descriptive text is placed near the visual element in the customer journey user interface. FIG. 9 illustrates an example in which the visual element is an interactive toggle button labeled "Create Interactively".

At operation 810, the system receives a user interaction with the visual element. In some cases, the operations of this step refer to, or may be performed by, a customer journey user interface as described with reference to FIGS. 2, 5, and 9-11. For example, in at least one embodiment, the customer journey user interface receives an interaction with the visual element, such as a mouse click or a finger tap. In at least one embodiment, the visual element changes to reflect that the customer journey user interface has received the user interaction. For example, FIG. 9 illustrates a toggle button labeled "Create Interactively" that has slid towards the right side of the display after it has been interacted with.

At operation 815, the system initiates a tracking session based on the user interaction with the visual element, where the user interactions with the digital content channel are monitored based on the tracking session. In some cases, the operations of this step refer to, or may be performed by, an event listener component as described with reference to FIGS. 2 and 3. For example, the customer journey user interface receiving a user interaction with the visual element, the customer journey user interface notifies the event listener component, and the event listener component initiates the tracking session in response to the notification. According to some aspects, during the tracking session, the event listener component monitors and records user interactions based on the selection of a customer journey from the plurality of customer journeys.

According to some embodiments, at operation 820, the system displays the digital content channel in a tracking window associated with the tracking session. In some cases, the operations of this step refer to, or may be performed by, a customer journey user interface as described with reference to FIGS. 2, 5, and 9-11. For example, in cases in which the user interaction is from a user who is authoring the customer journey, the customer journey user interface displays the digital content channel in a tracking window, such as a subtab of the customer journey user interface. Thereafter, when the user has selected a customer journey from the plurality of customer journeys for a tracking session, the user interactions with the digital content channel displayed in the tracking window are monitored and recorded with the customer identifier associated with the customer journey.

Therefore, by displaying the digital content channel in the tracking window, the customer journey optimization helps to optimize the process of authoring a customer journey by eliminating the need for a user to switch between views in a user interface to interact with the digital content channel to provide event data for use in the customer journey authoring process.

According to some aspects, the event listener component ends the tracking session based on a second user interaction with the visual element. For example, referring to FIG. 9, the customer journey user interface may receive a second user interaction with the "Create Interactively" toggle button and notify the event listener component of the second interaction. In response to the notification of the second user interaction, the event listener ends the tracking session by ceasing to monitor the user interactions on the digital content channel. In at least one embodiment, the customer journey user interface displays a pop-up window after it receives the second user interaction with the visual element that asks the user to confirm that they intend to end the tracking session. In this case, the event listener component ends the tracking session after it receives notification of a confirmation of the second user interaction from the customer journey user interface.

FIG. 9 shows an example of initiating a tracking session according to aspects of the present disclosure. Referring to FIG. 9, customer journey user interface 900 provides the visual element for initiating the tracking session (the toggle button labeled "Create Interactively") as described with reference to FIG. 8. Furthermore, customer journey user interface 900 provides a visual element for a user (e.g., an author of a customer journey) to instruct a workflow generation component described with reference to FIG. 2 to select a customer journey from a plurality of customer journeys, as described with reference to FIG. 7. In this case, the customer journey corresponds to a series of selectable fields, such as a URL associated with the digital content channel, a namespace identifying the type of customer identifier, a keypath for the customer identifier email address, and a value for the customer identifier email address. In at least one embodiment, the a customer journey is associated with the value for the customer identifier. In at least one embodiment, a customer journey is further identified according to the URL for the digital content channel. Customer journey user interface 900 is an example of, or includes aspects of, the corresponding element described with reference to FIGS. 2, 5, 10, and 11.

Figure 10:
FIG. 10 shows an example of displaying an event definition according to aspects of the present disclosure.

FIG. 10 shows an example of displaying an event definition according to aspects of the present disclosure. Referring to FIG. 10, customer journey user interface 1000 displays a visual element representing an event definition included in a customer journey (in this case, an interactive icon labeled "Interactive_Event1"). By interacting with the visual element, customer journey user interface 1000 displays the event data and the event definition as described with reference to FIG. 7 in a sidebar. As shown in FIG. 10, customer journey user interface 1000 also displays information not included in the event definition, but associated with the event definition, such as the user name of the authoring user (e.g., the field labeled "Author"). Furthermore, the customer journey is displayed in a tab of customer journey user interface 1000 labeled "Journey151". Customer journey user interface 1000 also displays a tab labeled with a URL. In response to a user interaction with the URL tab, customer journey user interface 1000 displays the digital content channel as described with reference to FIG. 7. Additionally, customer journey user interface 1000 continues to display the visual element for selecting the tracking session described with reference to FIG. 8. In this case, the visual element includes an indication that the tracking session is active. Customer journey user interface 1000 is an example of, or includes aspects of, the corresponding element described with reference to FIGS. 2, 5, 9, and 11.

Figure 11:
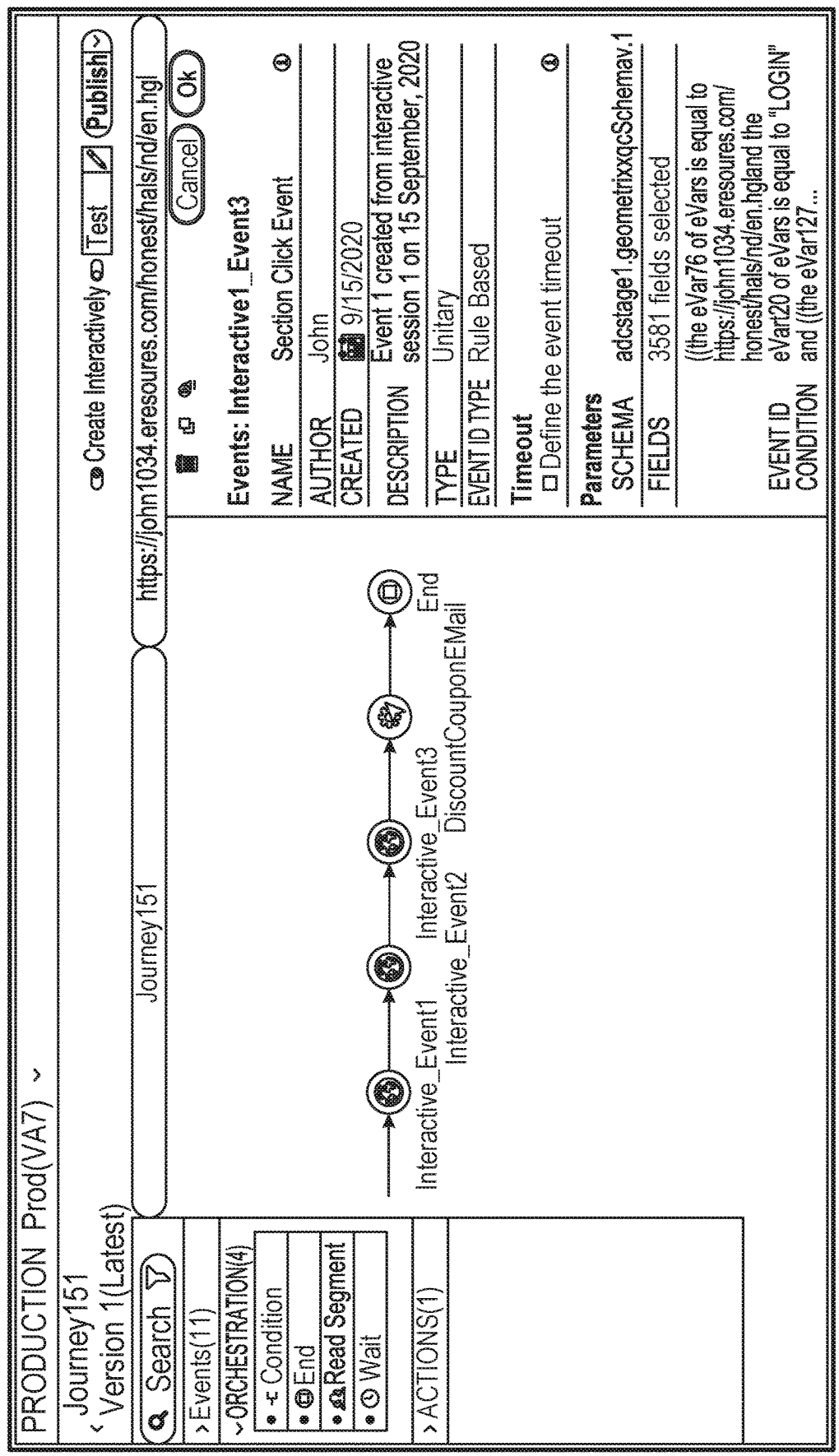
FIG. 11 shows an example of updating a customer journey user interface according to aspects of the present disclosure.

FIG. 11 shows an example of updating a customer journey user interface 1100 according to aspects of the present disclosure. A redundant description of similar elements described with reference to FIG. 10 is omitted. Referring to FIG. 11, a workflow generation component described with reference to FIG. 2 updates customer journey user interface 1100 with a visual element representing three event definitions in addition to "Interactive_Event1". As in the case described with reference to FIG. 10, each visual element is interactive, and an interaction with the visual element causes customer journey user interface 1100 to display the event data and/or the event definition associated with the visual element. Furthermore, each customer journey user interface 1100 displays the ordered sequence of event definitions in the customer journey as a sequence of visual elements connected by arrows indicating the ordered sequence.

According to some aspects, customer journey user interface 1100 displays a user-editable field corresponding to the event definition and receives user input for the user-editable field. For example, each field displayed by customer journey user interface 1100 corresponding to information included in the event definition is editable by the user (for example, a customer identifier, an event type, etc.). The user may select a field (for example, by clicking on the field) and may enter new information into the field via word entry, drop-down menu selection, or the like. The user may also use customer journey user interface 1100 to update fields in a rule-based data schema, if applicable. Furthermore, the user may update event dependencies in the ordered sequence of event definitions determined by the workflow generation component as described with reference to FIG. 7 via an input to the customer journey interface. According to some embodiments, the user updates the event dependencies by dragging the visual element associated with the event definition to a new position in the customer journey interface, and the workflow generation component updates the data schema associated with the event definition to override the event definition dependencies included in the data schema. Upon receiving this user input, according to some aspects, customer journey user interface 1100 notifies the workflow generation component of the user input, and the workflow generation component updates the event definition based on the user input. Customer journey user interface 1100 in turn updates to display the updated event definition. Customer journey user interface 1100 is an example of, or includes aspects of, the corresponding element described with reference to FIGS. 2, 5, 9, and 10.

Figure 12:
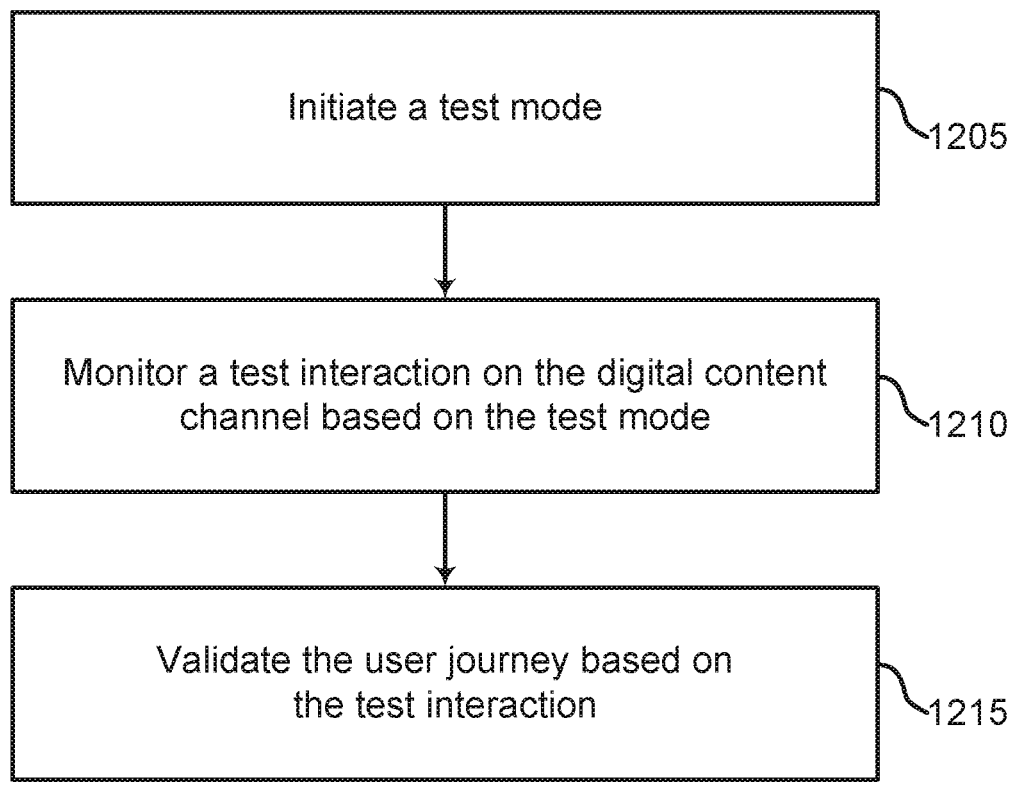
FIG. 12 shows an example of validating a customer journey according to aspects of the present disclosure.

FIG. 12 shows an example of validating a customer journey according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 12, the system provides a test mode for validating a customer journey. For example, during a test mode, the system is able to test the occurrence of user interaction events according to a predetermined rule-based data schema, such that if a second user interaction event is meant to occur in response to the occurrence of a first user interaction event, the system can validate the occurrence of the second event by running the first user interaction event and display the validation to the user via the customer journey user interface.

At operation 1205, the system initiates a test mode. In some cases, the operations of this step refer to, or may be performed by, an event listener component as described with reference to FIGS. 2 and 3. For example, referring to FIGS. 10 and 11, a customer journey user interface displays a visual element for initiating a test mode (a button labeled "Test" next to a pencil icon). After receiving a user interaction with the visual element, the customer journey user interface notifies the event listener component, and the event listener component enters the test mode in response to the notification.

At operation 1210, the system monitors a test interaction on the digital content channel based on the test mode. In some cases, the operations of this step refer to, or may be performed by, an event listener component as described with reference to FIGS. 2 and 3. For example, while the test mode is active, the customer journey user interface receives an interaction with the digital content channel, displayed in the customer journey user interface or in a separate browser. The test interaction is similar to a user interaction as described with reference to FIG. 7, and the event listener monitors the test interaction similarly to monitoring the user interaction as described with reference to FIG. 7.

At operation 1215, the system validates the customer journey based on the test interaction. In some cases, the operations of this step refer to, or may be performed by, an event curator component as described with reference to FIGS. 2 and 3. For example, a second user interaction event (such as sending a discount coupon email, as shown in FIG. 11) may be included in an ordered sequence of events in the customer journey, and the second user interaction event should occur in response to a first user interaction event (such as clicking on a particular link on the digital content channel). In this case, the test interaction is clicking on the particular link. The event listener component notifies the event curator component that the first user interaction event has occurred, and the event curator component then validates the customer journey by determining if the second user interaction event has appropriately occurred in response to the first user interaction event.

In at least one embodiment, after the event curator component determines that the second user interaction event has occurred, the event curator component notifies the workflow generation component, and the workflow generation component updates the customer journey user interface in response to the notification to display the validated status of the customer journey. For example, visual elements representing event definitions displayed in the customer journey user interface and/or other visual elements, such as the arrows representing the ordered sequence of events, can be updated (such as by changing colors, outline shapes, position on the interface, changing labels, etc.) to display that the customer journey is validated. Therefore, a user can test a customer journey without leaving the customer journey user interface. For example, the user does not have to proceed to an external email service to determine if the discount coupon email was appropriately sent.

Updating a Customer Journey for a Target Customer

Figure 13:
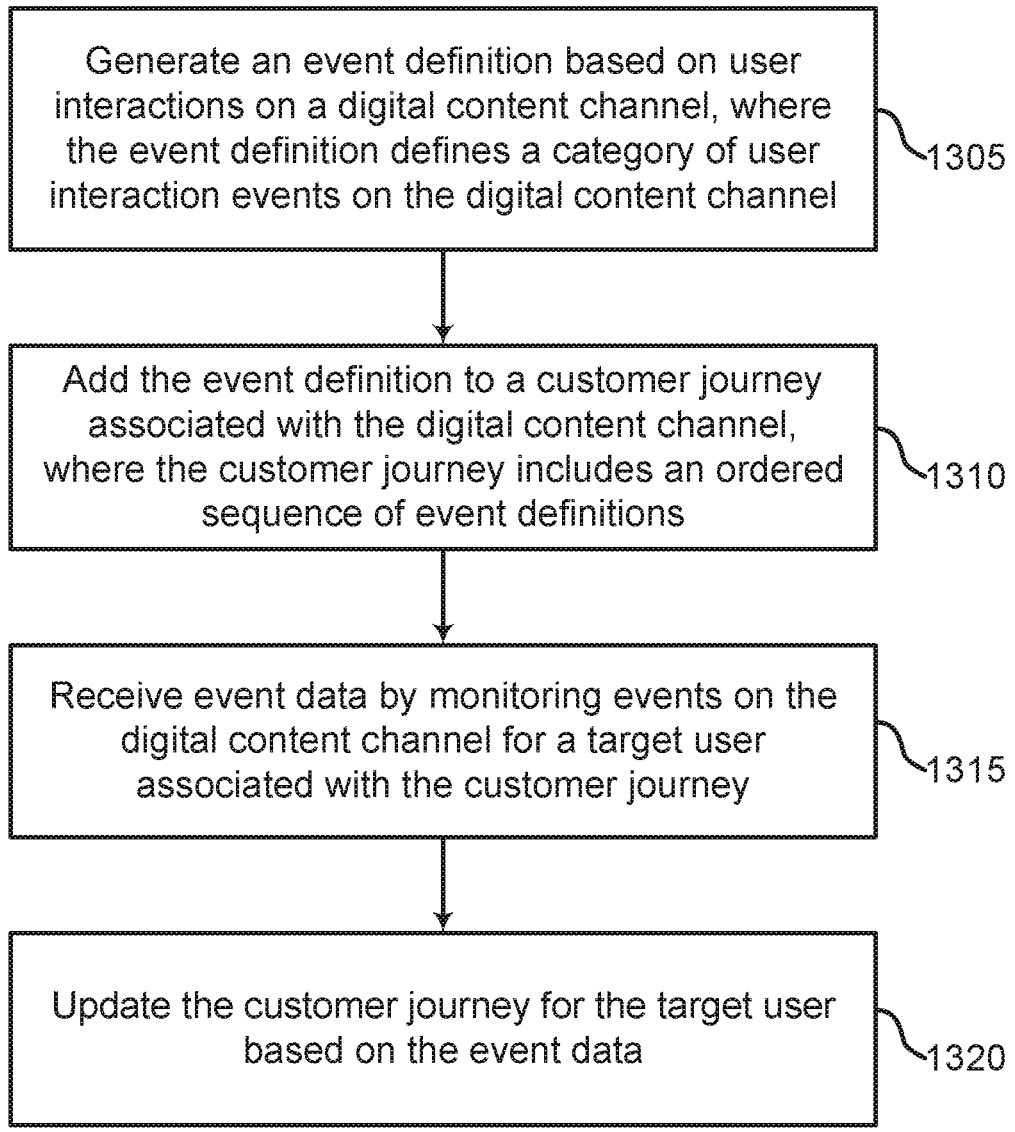
FIG. 13 shows an example of updating a customer journey for a target customer according to aspects of the present disclosure.

In FIG. 13, a method for customer journey optimization is described. One or more aspects of the method include generating an event definition based on user interactions on a digital content channel, wherein the event definition defines a category of user interaction events on the digital content channel; adding the event definition to a customer journey associated with the digital content channel, wherein the customer journey comprises an ordered sequence of event definitions; receiving event data by monitoring events on the digital content channel for a target customer associated with the customer journey; and updating the customer journey for the target customer based on the event data.

Some examples of the method further include selecting the customer journey from a plurality of customer journeys, wherein the event definition is added to the customer journey based on the selection. In some aspects, the event definition includes an event type and an identifier of the digital content channel.

Some examples of the method further include comparing the event definition and the event data. Some examples further include determining that the event data matches the category defined by the event definition based on the comparison, wherein the customer journey is updated based on the determination.

Some examples of the method further include identifying a state of the digital content channel. Some examples further include determining that the state of the digital content channel matches the event data.

FIG. 13 shows an example of updating a customer journey for a target customer according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. Referring to FIG. 13, the system updates a customer journey for a target customer based on received event data.

At operation 1305, the system generates an event definition based on user interactions on a digital content channel, where the event definition defines a category of user interaction events on the digital content channel. In some cases, the operations of this step refer to, or may be performed by, an event curator component as described with reference to FIGS. 2 and 3. In some embodiments, the event curator component generates the event definition based on user interactions on a digital content channel as described with reference to FIG. 7.

At operation 1310, the system adds the event definition to a customer journey associated with the digital content channel, where the customer journey includes an ordered sequence of event definitions. In some cases, the operations of this step refer to, or may be performed by, a workflow generation component as described with reference to FIGS. 2 and 3. in some embodiments, the workflow generation component adds the event definition to the customer journey associated with the event definitions as described with reference to FIG. 7.

At operation 1315, the system receives event data by monitoring events on the digital content channel for a target customer associated with the customer journey. In some cases, the operations of this step refer to, or may be performed by, an event listener component as described with reference to FIGS. 2 and 3. In some embodiments, the event listener component receives event data by monitoring events on the digital content channel in a similar manner to monitoring user interactions on a digital content channel as described with reference to FIG. 7. For example, the target customer corresponds to a customer identifier included in the event data. In some embodiments, the customer identifier is selected and determined as described with reference to FIG. 7.

At operation 1320, the system updates the customer journey for the target customer based on the event data. In some cases, the operations of this step refer to, or may be performed by, a workflow generation component as described with reference to FIGS. 2 and 3. For example, in some embodiments, the workflow generation component updates an event definition in an ordered sequence of event definitions with the event data corresponding to the event definition.

According to some aspects, an event curator component compares the event definition and the event data and determines that the event data matches the category defined by the event definition based on the comparison, wherein the workflow generation component updates the user journey based on the determination. In at least one embodiment, the event type of the event definition defines the category of user interaction events on the digital content channel as described with reference to FIG. 7, and the event curator component determines if the event identifier included in the event data matches the event type included in the event definition. For example, in at least one embodiment, event identifiers are associated with the event types in a data schema stored in a database (for example, as described with reference to FIG. 1). The event curator component associates an event type with the customer journey. If the event identifier is associated with the event type that is associated with the customer journey, the event curator instructs the workflow generation component to update the user journey by including the event data in the associated event definition in the customer journey.

According to some aspects, the event listener component identifies a state of the digital content channel. For example, in at least one embodiment, the event listener component determines a value or values of a visit-based variable as described with reference to FIG. 7. According to some aspects, the event curator component determines that the state of the digital content channel matches the event data. For example, when the event listener component receives a user interaction with the digital content channel, the event listener component passes the value of the visit-based variable at the time of the user interaction, as well as the event definition, to the event curator component. The event curator component compares the visit-based variable to the configuration identifier included in the event definition. If the event curator component determines that the visit-based variable does not match the configuration identifier, but that the other information in the event definition matches an event definition that has already been added to the customer journey, the event curator component instructs the workflow generation component to update the event definition that has already been added to the customer journey to include the visit-based value in the configuration identifier.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:
1. A method comprising:
displaying, by a customer journey user interface of a workflow orchestration platform, a workflow canvas including a representation of a customer journey cor- responding to a digital content channel, wherein the customer journey comprises an ordered sequence of event definitions;

displaying the digital content channel within the customer journey user interface;

monitoring, by an event listener component of a computer server of the workflow orchestration platform, user interactions with digital content channel;

receiving, by the event listener component of the computer server of the workflow orchestration platform, an event payload generated in response to a user interaction with the digital content channel based on the monitoring, wherein the event payload comprises event data describing the user interaction;

generating, by an event curator component of the computer server of the workflow orchestration platform, an event definition based on the event data from the event payload, wherein the event definition defines a category of user interaction events on the digital content channel;

adding, by a workflow generation component of the computer server of the workflow orchestration platform, the event definition to the customer journey; and displaying, via the customer journey user interface, a representation of the customer journey including a visual representation of the added event definition.

2. The method of claim 1, further comprising:
selecting, by the workflow generation component, the customer journey from a plurality of customer journeys, wherein the event definition is added to the customer journey based on the selection.

3. The method of claim 1, further comprising:
initiating, by the event listener component, a tracking session, wherein the user interactions are monitored based on the tracking session.

4. The method of claim 3, further comprising:
providing, by a customer journey user interface, a visual element for selecting the tracking session; and
receiving, by the customer journey user interface, a user interaction with the visual element, wherein the tracking session is initiated in response to the user interaction.

5. The method of claim 4, further comprising:
displaying, by the customer journey user interface, the digital content channel in a tracking window associated with the tracking session, wherein the user interactions are monitored based on the digital content channel being displayed in the tracking window.

6. The method of claim 1, further comprising:
updating, by the workflow generation component, a customer journey user interface with a visual element representing the event definition.

7. The method of claim 1, further comprising:
integrating the digital content channel with the workflow orchestration platform via a software development kit (SDK), wherein the monitoring is based on the SDK.

8. The method of claim 1, wherein:
the event data includes an event identifier, a customer identifier, and a configuration identifier.

9. The method of claim 1, wherein:
the event definition includes an event type and an identifier of the digital content channel.

10. The method of claim 1, further comprising:
displaying, by the customer journey user interface, a user-editable field corresponding to the event definition;

receiving, by the customer journey user interface, user input for the user-editable field; and
updating, by the workflow generation component, the event definition based on user input.

11. The method of claim 1, further comprising:
receiving, by the workflow generation component, an event removal instruction; and
removing, by the workflow generation component, the event definition from the customer journey in response to the event removal instruction.

12. The method of claim 1, further comprising:
initiating, by the event listener component, a test mode;
monitoring, by the event listener component, a test interaction on the digital content channel based on the test mode; and
validating, by the event curator component, the customer journey based on the test interaction.

13. The method of claim 1, further comprising:
detecting, by the event listener component, a status of the digital content channel at a time of the user interaction, wherein the event definition is generated based on the status of the digital content channel.

14. A method comprising:
displaying, by a customer journey user interface of a workflow orchestration platform, a workflow canvas including a representation of a customer journey corresponding to a digital content channel, wherein the customer journey comprises an ordered sequence of event definitions;

receiving, by the workflow orchestration platform, a user command to initiate a tracking mode;

displaying, by the workflow orchestration platform, the digital content channel within the customer journey user interface based on the tracking mode;

monitoring, by an event listener component of a computer server of the workflow orchestration platform, user interactions with the digital content channel based on the tracking mode;

generating, by an event curator component of the computer server of the workflow orchestration platform, an event definition based on the user interactions on a digital content channel, wherein the event definition defines a category of user interaction events on the digital content channel;

adding, by a workflow generation component of the computer server of the workflow orchestration platform, the event definition to a customer journey associated with the digital content channel, wherein the customer journey comprises an ordered sequence of event definitions;

receiving, by the event listener component of the computer server of the workflow orchestration platform, event data by monitoring events on the digital content channel for a target customer associated with the customer journey; and updating, by the workflow generation component of the computer server of the workflow orchestration platform, the customer journey for the target customer based on the event data.

15. The method of claim 14, further comprising:
selecting, by the workflow generation component, the customer journey from a plurality of customer journeys, wherein the event definition is added to the customer journey based on the selection.

16. The method of claim 15, further comprising:
identifying, by the event listener component, a state of the digital channel; and determining, by the event curator component, that the state of the digital channel matches the event data.

17. The method of claim 14, wherein:
the event definition includes an event type and an identifier of the digital content channel.

18. The method of claim 14, further comprising:
comparing, by the event curator component, the event definition and the event data; and
determining, by the event curator component, that the event data matches the category defined by the event definition based on the comparison, wherein the customer journey is updated based on the determination.

19. An apparatus comprising:
at least one processor; and
at least one memory storing instructions executable by the at least one processor, wherein the instructions include code comprising:
   a user interface configured to display a digital content channel and a representation of a customer journey associated with the digital content channel;
   an event listener service configured to receive event data by monitoring user interactions on the digital content channel;
   an event curator service configured to generate an event definition based on the event data, wherein the event definition defines a category of user interaction events on the digital content channel; and
   a workflow generation component configured to add the event definition to a customer journey associated with the digital content channel, wherein the customer journey comprises an ordered sequence of event definitions.

20. The apparatus of claim 19, wherein:
the customer journey user interface is further configured to display a visual element representing the event definition.

* * * * *